Dec. 29, 1942.   R. L. DAVIS   2,306,529
DIELECTRIC TESTING-METHOD AND MEANS
Filed Oct. 28, 1941   2 Sheets-Sheet 1

INVENTOR.
Ralph L. Davis
BY
ATTORNEY

Dec. 29, 1942.　　　　　R. L. DAVIS　　　　　2,306,529
DIELECTRIC TESTING-METHOD AND MEANS
Filed Oct. 28, 1941　　　2 Sheets-Sheet 2

INVENTOR.
Ralph L. Davis
BY Samuel Ostrolenk
ATTORNEY

Patented Dec. 29, 1942

2,306,529

UNITED STATES PATENT OFFICE 2,306,529

DIELECTRIC TESTING—METHOD AND MEANS

Ralph L. Davis, Wallingford, Conn.

Application October 28, 1941, Serial No. 416,859

25 Claims. (Cl. 175—183)

My invention relates to novel apparatus for and methods of testing ignition systems and more specifically relates to novel apparatus for and methods of testing the ignition systems of airplanes, automobiles, and of spark plugs and for determining the existence of electrical faults in such systems.

The distributor and the conductors extending from the segments of the distributor of an ignition system of an airplane are usually mounted in back of the engine and accordingly are very difficult to reach. The dielectric conditions of the conductors of the distributor must be constantly tested for any short circuits or other failures which may occur, since such failures will cause a corresponding failure of the ignition at the spark plug and therefore of that particular cylinder of the engine.

Heretofore, no practical means has been available for testing the dielectric condition of the distributor system.

Accordingly, an object of my invention is to provide novel apparatus for and methods of testing the distributor system of the ignition system.

A further object of my invention is to provide a novel method for simultaneously testing all of the conductors of the distributor system for the determination of a dielectric fault.

Still another object of my invention is to provide a novel method of simultaneously testing the distributor system for dielectric fault and for thereafter individually testing each electrical system individual to each of the spark plugs.

Still another object of my invention is to provide novel apparatus and methods of testing insulation resistance of the ignition system.

Still a further object of my invention is to provide a novel method of testing dielectric and insulation resistance of an ignition system.

In addition to a careful test of the ignition system, it is also important to test the condition of each individual spark plug not only for its breakdown voltage, which is important, but for the possible existence of "sneak" currents which may have been created by the accumulation of conducting materials which may produce a leakage current by-passing the spark plug terminals.

In such a case although spark discharge may be produced across the plug terminals, when sufficient voltage is applied, its strength is considerably reduced due to the fact that a by-pass exists for some of the current which normally should have flowed through the spark gap.

In accordance with my invention, the following test for determining the condition of the spark plug is made: The spark plug is inserted in a transparent envelope, preferably of glass filled with a gas, for instance $CO_2$, at a pressure simulating the pressure in an airplane engine cylinder during the instant of breakdown of the spark plug. Voltage is then applied to the spark plug corresponding to that which is applied in an engine and the spark is then observed.

The voltage on the secondary is now changed and the operator observes not only the condition at the terminals of the spark plug but also the condition adjacent to it for any evidence of leakage currents.

A milli-ammeter employed as described hereinafter provides indications of any such leakage currents at varying ranges of voltages below the breakdown voltage of the spark plug.

Accordingly, an object of my invention is to provide novel apparatus for and methods of testing spark plugs.

Still another object of the present invention is the provision of means for determining whether a coating of rubber or other insulating material on conductive material is continuous and impervious.

These and many other objects of my invention will be apparent and, where not apparent, pointed out in the following description and drawings in which.

Figure 1:
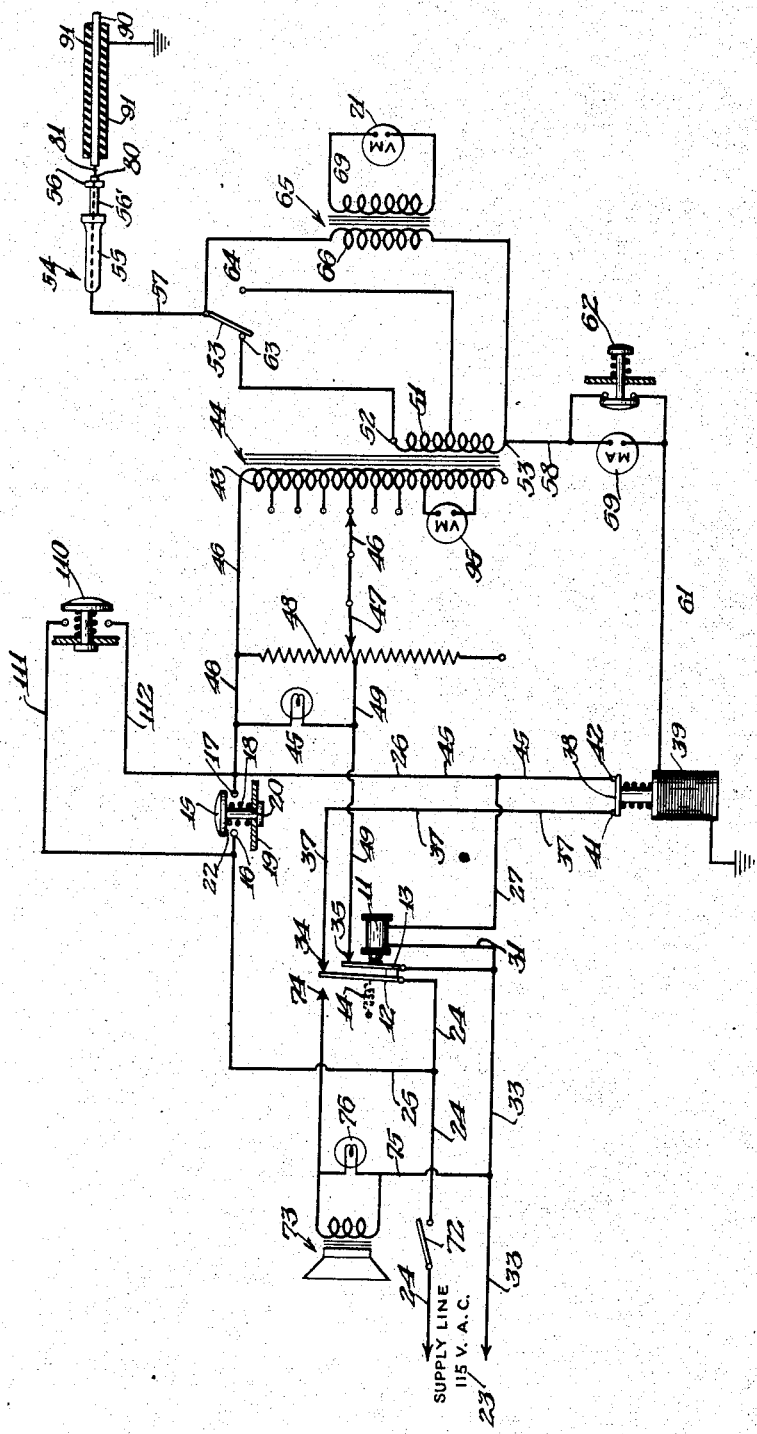
Figure 1 is a schematic circuit diagram of a preferred embodiment of my invention.

Referring now to Figure 1, normally, the initiating relay 11 which controls the energization of the system in the manner to be described hereinafter is deenergized and its armatures 12 and 13 are at their back contact position under the action of spring 14.

The energization circuit of relay 11 is controlled by push button 15. Normally the conducting portion 22 of push button 15 is held out of engagement with contacts 16 and 17 by the action of spring 18, one end of which is secured to the fixed ring 19 having a slot through which pin 20 extends. The other end of the pin 20 carries the conducting head 22 of the push button 15 and the entire switch is held in disengaged position by the spring pressure against the disk 22 and fixed ring 19.

In order to initiate operations the operator will momentarily depress the push button 15 to bridge contacts 16 and 17 whereupon a circuit is completed for the relay 11 over a circuit from the 115 volt A. C. supply line 23 over conductors 24 and 25, bridged contacts 16 and 17, bridged by the conducting dome 22 of push button 15, conductors 26 and 27, to the winding of relay 11 and thence over conductor 31 to the return lead 33 of the supply line 23.

Relay 11 is thereupon energized and operates its armatures 12 and 13 from their back contact position to their front contact position at which they engage contacts 34 and 35. The engagement of armature 12 with contact 34 provides a locking circuit for the relay 11 which by-passes the push button 15, which extends the circuit from conductor 24 over the conductor 37, armature 38 of the relay 39 and conductor 45 and conductor 27 to the winding of relay 11.

Armature 38 bridges its contacts 41 and 42 where it is held under action of spring 39' when the relay 39 is deenergized but will function as will be described in more detail hereinafter to open the locking circuit for the relay 11, when an electrical fault in the system being measured is discovered, by moving its armature 38 from the position shown to disengage contacts 41 and 42.

The energization of relay 11 also completes an energizing circuit for the primary winding 43 of the transformer 44, the circuit extending from the voltage supply 23 over conductor 24, armature 12 and its front contact 34, conductor 37, contacts 41 and 42 bridged by the armature 38, conductor 45, conductor 46, primary winding 43, tap switches 46 and 47, potentiometer 48, conductor 49 to the front contact 35 and armature 13 and over conductor 33 to the source of supply.

It will be noted that this circuit which energizes the transformer 44 is completed not only over the front contacts of the initiating relay 11 but also depends on the back contacts of the fault finding relay 39 so that this circuit is initiated by the energization of relay 11 and will, as hereinafter be apparent, be terminated upon the instant a fault is detected.

The voltage across the primary winding 43 of transformer 44 is controlled by the resistance in the potentiometer 48 determined by the position of tap switch 47. The ratio of turns between the primary winding 43 and the secondary winding 51 of the transformer 44 and therefore the step-up voltage will be determined by the position of the tap switch 46 in the manner which is now well known in the art.

Thus by means of the two tap switches 46 and 47, any series of desired voltages may be induced in the secondary 51.

One terminal 52 of the secondary 51 is connected over the distributor brush 53 to a hand locator or testing electrode 54 which comprises an insulating handle 55 encasing a conductor 56' which extends from the conductor 57 and is arranged to detect a fault in a manner to be described. The conductor 56' has a contact face 56 for this purpose.

The opposite terminal 53 of the secondary 51 extends over the conductor 58 and through the ammeter 59 and over conductor 61 to the alternating current relay 39 and thence to ground.

Relay 39, it will be noted, is thus connected on the low potential or ground side of the secondary winding 51 so that it is protected from any injury by high voltage. Ammeter 59 in this circuit provides an indication of the current flowing in the secondary circuit and will, as will be shown hereinafter, provide an indication of leakage currents in "sneak" circuits of the system being tested.

In order to shunt out the ammeter 59 a push button 62 provides a by-pass circuit around the ammeter whenever tests are made which are for the purpose solely of detecting dielectric failures and not merely leakage currents, as in such case the instantaneous current flow on a short circuit may burn out the ammeter if permitted to flow therethrough.

The distributor 53 is provided with a series of taps 63 and 64 so as to further regulate the ratio of turns of the primary and secondary winding.

Connected across the terminals of the portion of the secondary which is employed in the system is a voltage transformer 65, one terminal 66 of the primary of which is connected to the brush terminal 67 and the other terminal 68 of which is connected to the terminal 53 of the secondary 51.

The secondary winding 69 of transformer 65 is connected across the volt meter 71 to provide indications of the voltage across the terminals of the secondary 51 so that the operator is constantly apprised of the test voltage being applied. In the alternative a volt meter 95 may be connected across a portion of the primary 43 of the transformer 44. This volt meter will give a reading in proportion to the voltage in the secondary circuit and may be calibrated to read accordingly.

Normally, before any testing operations are performed, switch 72 is closed and completes an energizing circuit for the horn or loudspeaker 73 of any well known construction, the circuit extending from the power supply 23 over conductor 24 through the armature 12 in engagement with its back contact 74 and through the winding of the horn 73 to the return circuit over conductor 75.

A parallel circuit is also completed through the lamp 76 so that upon the closing of the switch 72, the horn 73 produces an audible sound in a manner well known and the lamp 76 is illuminated, indicating that energy is being supplied from the source and the tester is ready for operation.

In order now to operate the system for testing, the operator depresses the push button 15, completing an energizing circuit for the initiating relay 11 as described hereinabove. Initiating relay 11 upon energization locks itself and deenergizes the circuits for the horn 73 and lamp 76 as armature 12 leaves its back contact 74, and also completes an energizing circuit which extends the energy from the source of supply through the primary 43 of the transformer 44 to the tester 55.

A visual indication of the energization of primary 43 is provided by the lamp 40 which is connected across the transformer as will be evident from the circuit diagram.

The potential is now applied to the testing contact 56 of the tester 55 and it is now ready to be connected to the conductor whose insulation is to be tested. Just preceding the application of the tester for testing the insulation, the tap switches 46, 47 and 53 have been positioned so as to secure the desired voltage as indicated on either voltmeter 95 or 71 (depending on which is used) at the testing electrode 56.

Figure 2:
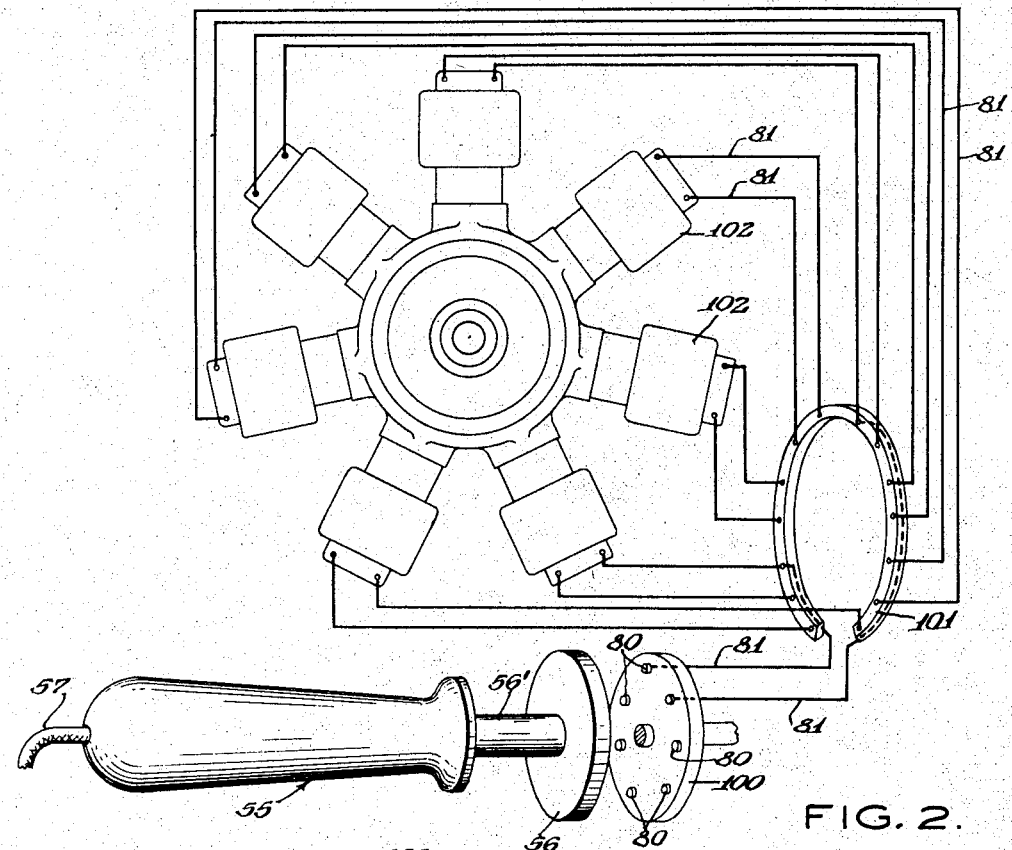
Figure 2 is a schematic view partly in perspective of the testing electrode about to be placed in contact with the distributor segments of an ignition system.

In the present instance, (as shown in Fig. 2), a simultaneous connection is made from the tester 55 to the segments 80 of the distributor 100 of an ignition system. Preceding this the magneto is removed to permit the test.

The ignition system of a gasoline engine is schematically illustrated in Fig. 2 in which a distributor 100 provided with distributor segments 80 individual to each of the spark plugs is illustrated. The circuit connections to the magneto have not here been shown and in fact are removed from the system during the testing operation. The rotating brush is not shown here.

Extending from each of these segments 80 are the usual individual conductors 81 which, after passing through the radio shield 101 extend to terminals 203' (Fig. 3) of individual spark plugs in the cylinders 102.

Figure 3:
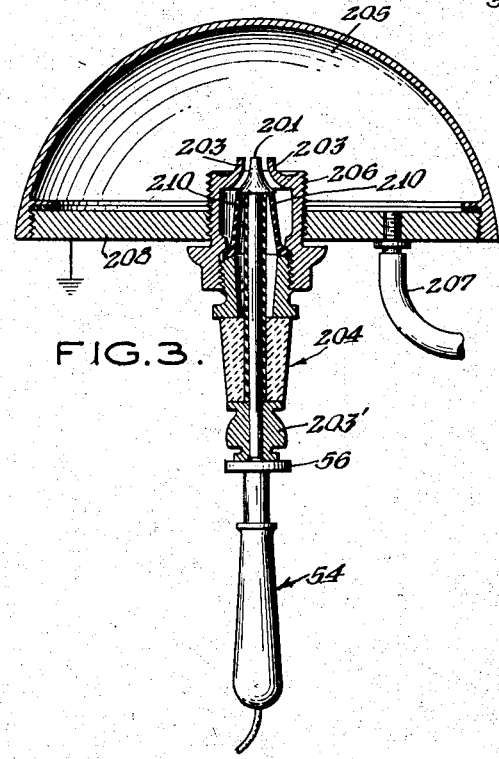
Figure 3 is a cross-sectional view showing an adaptation of my invention for testing the spark plugs.

As is well known, these conductors are insulated so as to prevent any by-pass circuit, the return circuit being through the opposite terminal of the plug to ground, as schematically illustrated at 208 in Fig. 3. In the present illustration two spark plugs are shown per cylinder as is common in airplane practice.

In the event that there is any insulation weakness or breakdown in any of the conductors, their associated spark plugs will, of course, not be activated since the current will take the shorter path to ground provided by the insulation defect. That cylinder is therefore non-effective.

The present device, as will now be shown, will first simultaneously test all of the conductors to determine whether there is any such weakness in any of them; and if such a weakness does show up, to individually test the circuits until the breakdown has been localized.

To this end the magneto system is, as described above disconnected and the spark plugs are removed. Tester 56, Fig. 2, is now brought into engagement with all of the segments 80 with the system of Fig. 1 energized as described above.

If now, the insulation of all of the conductors 81 to the terminals 80 to which the tester 56 is connected are in good condition; that is to say, there is no fault or grounding of any of these conductors, the secondary 51 will remain open circuited. Should, however, there be a fault in any one of the ignition circuits due to the fact that any of the conductors are grounded, a circuit will extend from the transformer 52 of secondary 51 over brush 53, conductors 57 and 56', contact face 56, through the conductor of the ignition system where the fault exists and through the fault to ground, returning over the relay 39 and through conductor 61, closed switch 62 and conductor 58 to the opposite terminal 60 of the secondary 51. The current flowing in this circuit will be sufficient to energize relay 39 which will operate its armature 38 against the action of spring 38' to disengage contacts 41 and 42. Disengagement of contacts 41 and 42 will open the energizing circuit to the transformer 44, thereby instantly terminating current flow over the short circuit and will also deenergize relay 11 so that its armatures 12 and 13 drop to their back contact position under the action of spring 14. Armature 12 in engagement with its back contact 74 will complete an energizing circuit for the horn or audible indicating means 73 and for the visual lamp 76 so as to provide an audible and visual indication of the existence of a fault.

It is now necessary to indivdually test each of the distributor segments to determine in which particular circuit the fault lies. To this end the test electrode 55 having a substitute testing face 56 of any suitable size is (as is seen in Fig. 1) applied individually and successively to each of the distributor segments of the ignition system. In each instance, the push button 15 is closed to initiate operations and testing is performed in the manner described above. When no fault exists relay 39 will remain deenergized and there will be no signal at 73 or 76. When the segment containing the faulty conductor is reached, the same short circuit as described above will occur and provide the visual indication as described above.

A particularly beneficial characteristic of my system resides in the fact that not only are complete failures detected but where no complete failure is found, it is possible to detect lesser weak insulation conditions by operating the switch 62 to its open position. In such a case where leakage currents flow through weakened insulation, although the leakage current flowing may be insufficient to energize relay 39, such currents will be indicated on the milli-ammeter 59 which has a range of current indications for detecting such leakage currents and may, depending upon the leakages to be measured, range up to 10 milli-amperes.

A further advantage of my system resides in the fact that I may measure not only complete dielectric failures where absolute short circuits exist and conditions where leakage currents sufficient to seriously impair the efficiency of the ignition system exist but I may also detect weakened dielectric conditions by applying varying amounts of voltage to the electrode 56 in the manner described above.

In each case, it should be noted that the conductors 81 (Figs. 1 and 2) in an airplane ignition system are each covered with insulation 90 (Fig. 1) and then have an outer metallic protective covering 91. In the event of a dielectric loss or breakdown in insulation 90, a current path to ground is readily established through protective metallic covering 91 and the apparatus above described is brought into operation to produce an indication of this breakdown.

All of the conductors 81 of the ignition system (schematically shown in Fig. 2) are led through a radio shield 101 to individual spark plugs in the cylinders 102. Duplicate conductors 81 and spark plugs are usually used in modern airplane engines to ensure proper ignition. The spark plugs are removed prior to the test so that any breakdown indication will be caused only by a defect in the conductors and not by sparking across the spark plug gap.

When faulty insulation exists on a conductor, current will flow between conductor 81 and its metal sheath 91, thus completing the circuit for the relay 39 in the manner previously described.

This flow of current may tend further to break down the insulation and may, in fact, spark or arc and cause a pin point perforation or discoloration to appear at the outside of the metal sheath 91 at the point of the fault.

This latter result, rather than being avoided, is actually preferred, since it thus helps provide a visual indication of the exact point of the fault, and will thus make unnecessary the discarding of the entire length of wire.

In fact, after an indication is given by the apparatus that a particular conductor is at fault and such a pin point or discoloration fails to appear, the push-button 15 may be held depressed to cause such a visible burning out to appear at the point of the fault.

It may at times be necessary to perform testing operations at some distance from the cabinet which houses the apparatus. Accordingly, lead 57 to the testing electrode 55 may be made as long as desired. In this case, however, it would be inconvenient for the operator to return to the cabinet to depress push button 15 each time it is necessary to reconnect the apparatus after an indication is given.

To obviate this difficulty, an additional push button 110 is connected in parallel with push button 15 and operates in exactly the same manner as push button 15. Push button 110 may be mounted on the handle 55 of the testing electrode and conductors 111 and 112 for push button 110 may be led through the same cable as conductor 57.

The operator may then set the apparatus in operation by depressing push button 110 mounted on handle 59 when he is at some distance from the cabinet and thus may test a number of wires without returning to the cabinet or may apply repeated surges of current to a particular wire while simply holding the testing electrode 54.

By the use of the system described in Fig. 1, it is possible also to test the breakdown voltage of spark plugs and thus to determine whether the individual spark plugs are in good condition.

For this purpose, using the system of Fig. 1, the contacting face 56 of the testing electrode 54 is electrically connected to one terminal 201 of the spark plug 202, the other terminal 203 being grounded as is common and well known in the spark plug art.

The spark plug is placed in a chamber 205 preferably wholly or partly of glass or other transparent material and gas (for instance $CO_2$) is admitted through conduit 207 at a pressure equal to the compression reached in an airplane engine cylinder when the mixture is to be ignited.

For this purpose, the threaded end 206 of the spark plug is screwed into a threaded opening in the base 208 of chamber 205 and gas is admitted as described just above. Terminal 203 of the spark plug 202 is connected to threaded end 206 and is thus grounded through the metallic base 208 of the chamber. Terminal 201 of the spark plug extends through the spark plug and terminates in member 203'.

With switch 62 by-passing the ammeter 59, switches 72 and 15 are closed to energize the tester. Contacting face 56 of testing electrode 54 is then applied to the end 203' of terminal 203 the output voltage of the testing apparatus being adjusted by brushes 46, 47 and 53 as described above to the rated operating voltage of the spark plug. The spark is observed through the glass envelope of chamber 205. The spark plug may fail to spark entirely owing to a dielectric break-down within its structure or the spark may be obviously weak for the same reason; or sparking may be observed at points other than at the desired point of sparking.

In the operation of an airplane engine, conductive paths for "sneak" currents in the spark plug may be created by accumulation of conducting materials which may produce leakage currents by-passing the spark plug terminals. Such materials may collect along the insulation 210 and thus create a by-pass for the current. Although, the spark plug may spark, its strength may be greatly reduced by such a by-pass. Thus, although, by observation, a spark plug may seem to be in good condition when tested as above, my apparatus provides an additional test:

In testing the spark plug the voltage in the secondary circuit of my apparatus may be reduced to a point slightly below the rated sparking voltage of the spark plug.

Any current flow now due to accumulation of foreign materials and the break-down of the dielectric spacing between the terminals may be visible through the envelope of 205 as a glow or will be indicated on ammeter 59 when push-button 62 is depressed. The voltage is now gradually raised until the full voltage of the spark plug is reached. Also, if current flow is sufficient (of the order of 5–10 milliamperes) the horn 73 and light 76 of the apparatus of Fig. 1 will immediately indicate the defect.

If there has been no such dielectric breakdown within the spark plug and the leads therein are well insulated from each other, then no indication will appear or be heard and the spark plug will be found satisfactory.

The importance of such a test is that it will indicate any possible leaks within the spark plug itself which may (while the spark plug is able to spark) reduce the intensity of the spark.

The apparatus herein described may be utilized for various other purposes as, for example, discovering insulation faults in the windings of motors, generators, transformers, etc.

Thus, for instance, in various types of battery containers which are frequently made of metal which may be corroded by acids, a protective coating is placed on the interior of the container to prevent such corrosion. Such protective coating, as for instance rubber, is normally an insulating material as well.

Figure 4:
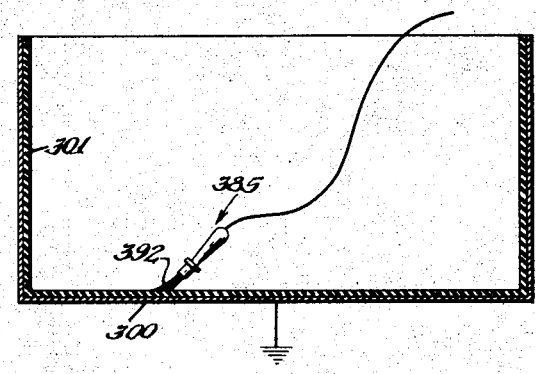
Figure 4 is a cross-sectional view showing an adaptation of my invention for testing the imperviousness of an insulating coating on a container of conductive material.

In Fig. 4 I have shown in schematic form a cross-sectional view of a battery container consisting of an outer metal container 300 having a rubber lining 301.

Any breakdown anywhere in the rubber lining will permit the acids to come into contact with the metal and corrode the same.

The testing electrode 305 having a brush type contacting face 302 may be connected to the apparatus of Fig. 1 and the metallic brush 302 may be swept over the inner surface 301 of the container. Wherever the lining 301 is worn or has been perforated sufficiently to substantially decrease the electrical resistance normally offered by the lining 301 sufficient current will flow through the secondary circuit as previously described to actuate the relay 39 and produce the aural and visual indication previously set forth.

Obviously, of course, the modification of Fig. 4 is not limited to merely battery containers, but may be utilized for testing any kind of container or structure having a metal lamination and an insulating lamination.

In the foregoing I have set forth a preferred embodiment of my invention together with a series of preferred adaptations and uses therefor.

Many variations in the form and construction of my invention should now be clear to those skilled in the art, and many other uses in connection with the testing of many other devices should also be obvious.

Since my invention is capable of various embodiments and various uses, I prefer to be bound not by the specific disclosures herein, but only by the appended claims.

I claim:

1. In a system for detecting electrical faults in an engine ignition system having a distributor with a plurality of contacts and having electrical connections extending individually from each of said contacts for connection to individual spark plugs, means for simultaneously applying a potential of the order of that normally applied to said circuits when in operation; and means operative in the event that a fault exists in any one of said circuits for indicating said fault.

2. In a system for detecting electrical faults in an engine ignition system having a distributor with a plurality of contacts and having electrical connections extending individually from each of said contacts for connection to individual spark plugs, means for simultaneously applying a potential of the order of that normally applied to said circuits when in operation; and means responsive to dielectric failure in any one of said electrical circuits for indicating the existence of the failure.

3. In a system for detecting electrical faults in an engine ignition system having a distributor with a plurality of contacts and having electrical connections extending individually from each of said contacts for connection to individual spark plugs, means for simultaneously applying a potential of the order of that normally applied to said circuits when in operation; means operative in the event that a fault exists in any one of said circuits for indicating said fault and means for simultaneously disconnecting the source of potential from said circuits.

4. In a system for detecting electrical faults in an engine ignition system having a distributor with a plurality of contacts and having electrical connections extending individually from each of said contacts for connection to individual spark plugs, means for simultaneously applying a potential of the order of that normally applied to said circuits when in operation; means responsive to dielectric failure in any one of said electrical circuits for indicating the existence of the failure; and means for simultaneously disconnecting the source of potential from said circuits.

5. In a system for detecting electrical faults in an engine ignition system having a distributor with a plurality of contacts and having electrical connections extending individually from each of said contacts for connection to individual spark plugs, means for simultaneously applying a potential of the order of that normally applied to said circuits when in operation, said means comprising a source of low voltage and a step-up current limiting transformer; and means operative in the event that a fault exists in any one of said circuits for indicating said fault.

6. In a system for detecting electrical faults in an engine ignition system having a distributor with a plurality of contacts and having electrical connections extending individually from each of said contacts for connection to individual spark plugs, means for simultaneously applying a potential of the order of that normally applied to said circuits when in operation; means operative in the event that a fault exists in any one of said circuits for indicating said fault; and means for thereafter individually testing each of said circuits for said fault.

7. In a system for detecting electrical faults in an engine ignition system having a distributor with a plurality of contacts and having electrical connections extending individually from each of said contacts for connection to individual spark plugs, means for simultaneously applying a potential of the order of that normally applied to said circuits when in operation; means operative in the event that a fault exists in any one of said circuits for indicating said fault; and means for indicating that said testing means is energized.

8. In a system for detecting electrical faults in an engine ignition system having a distributor with a plurality of contacts and having electrical connections extending individually from each of said contacts for connection to individual spark plugs, means for simultaneously applying a potential of the order of that normally applied to said circuits when in operation; means operative in the event that a fault exists in any one of said circuits for indicating said fault; and means for indicating the potential being applied to said testing means.

9. In a system for detecting the electrical faults in an engine ignition system having a distributor with a plurality of contacts and having electrical connection extending individually from each of said contacts for connection to individual spark plugs, means for simultaneously applying a potential of the order of that normally applied to said circuits when in operation; means operative in the event that a fault exists in any one of said circuits for indicating said fault; and means for indicating the insulation resistance of said circuits.

10. In a system for detecting electrical faults in an engine ignition system having a distributor with a plurality of contacts and having electrical connections extending individually from each of said contacts for connection to individual spark plugs, means for simultaneously applying a potential of the order of that normally applied to said circuits when in operation; means operative in the event that a fault exists in any one of said circuits for indicating said fault; and means for indicating leakage currents flowing across the insulation coverings of said conductors in said electrical circuits.

11. In a system for detecting electrical faults in an engine ignition system having a distributor with a plurality of contacts and having electrical connections extending individually from each of said contacts for connection to individual spark plugs, means for simultaneously applying a potential of the order of that normally applied to said circuits when in operation, said means comprising a source of low voltage and a step-up current limiting transformer; means operative in the event that a fault exists in any one of said circuits for indicating said fault; a current indicator connected in the secondary of said transformer for indicating leakage currents flowing in said circuits.

12. The method of testing electrical faults in an ignition system which comprises simultaneously applying potentials of the order of those which the circuits normally carry to all of the circuits of the ignition system, providing an indication in the event that current flows in any one of said circuits and thereafter individually applying voltages to each of said circuits for detecting the circuit in which the fault exists.

13. The method of testing electrical faults in an ignition system which comprises simultaneously applying potentials of the order of those which the circuits normally carry to all of the circuits of the ignition system and providing an indication in the event that current flows in any one of said circuits.

14. In a system for testing the dielectric conditions of a spark plug, means for inserting said spark plug to be tested in an envelope containing gas at the pressures employed in the cylinders in which the spark plug is to be used, a source of standard 115 volt A. C. supply, means for applying a potential from said source across the terminals of the spark plug sufficient to produce a breakdown across the terminals of the spark plug, and supplying sufficient current to permit leakage currents to flow in any electrical path which may exist which by-passes the terminal of the spark plug.

15. In a system for detecting electrical faults in an ignition system having a distributor having electrical circuit connections extending to an individual spark plug; means for applying potential to the electrical circuit of the order of that normally applied to said circuit when in operation, the spark plug associated with the circuit under test being first removed; and means operative in the event that an electrical fault exists for indicating said fault and disconnecting the source of potential.

16. In a system for detecting electrical faults in an ignition system having connections extending to a spark plug terminal, a source of standard voltage supply, a testing electrode; means including said testing electrode for applying potential to said connections; means for varying said voltage over a wide range in small increments; means for continuously indicating the voltage applied to said connections; means for instantaneously indicating a fault in said ignition system.

17. In a system for detecting electrical faults in an ignition system having connections extending to a spark plug terminal, a source of standard voltage supply, a testing electrode, transformer means connecting said source of supply to said electrode; means including said transformer for applying potential from said source to said connections through said testing electrode varying in small increments; and means for instantaneously indicating a fault in said ignition system; and means for continuously indicating the varying voltage applied through said testing electrode.

18. In a system for detecting electrical faults in an ignition system having connections extending to a spark plug terminal, a source of standard voltage supply, a testing electrode; means including said testing electrode for applying potential to said connections; means for varying said voltage over a wide range in small increments; means for continuously indicating the voltage applied to said connections; means for instantaneously indicating a fault in said ignition system; and means for indicating leakage current flowing in said ignition system.

19. In a system for detecting electrical faults in an ignition system having connections extending to a spark plug terminal, a source of standard voltage supply, a testing electrode; means including said testing electrode for applying potential to said connections; means for varying said voltage over a wide range in small increments; means for continuously indicating the voltage applied to said connections; means for instantaneously indicating a fault in said ignition system; said last mentioned means comprising a relay responsive to fault current flowing in said ignition system; said fault relay being connected on the ground side of said testing circuit.

20. In a system for detecting electrical faults in an ignition system having connections extending to a spark plug terminal, a source of standard voltage supply, a testing electrode, a circuit including said testing electrode, a relay connected on the low potential side of said circuit for controlling the application of potential from said source of supply to said testing electrode circuit, and means whereby said relay instantaneously disconnects said source of supply from said testing electrode circuit in the event of an electrical fault in said ignition system.

21. In a system for detecting electrical faults in an engine ignition system in which the spark plug and the magneto have first been disconnected, a source of standard A. C. voltage supply, a testing electrode for making contacts with the ignition circuit to be tested; circuit connections including transformers from said source of supply to said testing electrode; means including tabs on said transformer for varying the voltage applied to said testing electrode from said source in small increments over a wide range of voltages; relay means connected in said circuit from said source of supply to said testing electrode and responsive to fault currents flowing in said ignition circuit in the event of a fault therein; a milliammeter in said circuit from said source of supply to said testing electrode for indicating leakage currents in said ignition circuit; said relay means and milliammeter being connected in the ground side of said testing circuit.

22. In a system for detecting electrical faults in an engine ignition system in which the spark plug and the magneto have first been disconnected, a source of standard A. C. voltage supply, a testing electrode for making contacts with the ignition circuit to be tested; circuit connections including transformers from said source of supply to said testing electrode; means including tabs on said transformer for varying the voltage applied to said testing electrode from said source in small increments over a wide range of voltages; relay means connected in said circuit from said source of supply to said testing electrode and responsive to fault currents flowing in said ignition circuit in the event of a fault therein; a milliammeter in said circuit from said source of supply to said testing electrode for indicating leakage currents in said ignition circuit; said relay means and milliammeter being connected in the ground side of said testing circuit; and means controlled by said relay means in response to fault currents for disconnecting said source of supply from said testing electrode.

23. In a system for detecting electrical faults in an engine ignition system in which the spark plug and the magneto have first been disconnected, a source of standard A. C. voltage supply, a testing electrode for making contacts with the ignition circuit to be tested; circuit connections including transformers from said source of supply to said testing electrode; means including tabs on said transformer for varying the voltage applied to said testing electrode from said source in small increments over a wide range of voltages; relay means connected in said circuit from said source of supply to said testing electrode and responsive to fault currents flowing in said ignition circuit in the event of a fault therein; a milliammeter in said circuit from said source of supply to said testing electrode for indicating leakage currents in said ignition circuit; said relay means and milliammeter being connected in the ground side of said testing circuit; and means for continuously indicating the voltage supply to said testing electrode.

24. In a system for detecting electrical faults in an ignition system having connections extending to a spark plug, a source of standard voltage supply, a testing electrode; means for applying potential varying in small increments; means for instantaneously indicating a fault in said testing circuit; and remotely operated means for controlling the connection of said circuit from said source of supply to said testing electrode.

25. In a system for testing the dielectric conditions of a spark plug, an envelope containing gas at a pressure employed in electrical systems in which a spark plug is normally employed; means for inserting said spark plug in said envelope; a source of standard A. C. voltage supply; means for applying potential from said source to the terminals of said spark plug; means for varying the voltage applied to said spark plug in increments for measuring leakage currents flowing therein; means for indicating said leakage currents; and means for applying a breakdown voltage and determining the dielectric conditions of said plug.

RALPH L. DAVIS.